(12) United States Patent
Imagawa et al.

(10) Patent No.: US 7,767,345 B2
(45) Date of Patent: Aug. 3, 2010

(54) LITHIUM-AIR BATTERY

(75) Inventors: Haruo Imagawa, Nagoya (JP);
Hideyuki Nakano, Owariasahi (JP);
Hirozumi Azuma, Seto (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 37 days.

(21) Appl. No.: 11/968,414

(22) Filed: Jan. 2, 2008

(65) Prior Publication Data
US 2008/0176124 A1 Jul. 24, 2008

(30) Foreign Application Priority Data
Jan. 18, 2007 (JP) .............................. 2007-008907

(51) Int. Cl.
*H01M 12/04* (2006.01)
(52) U.S. Cl. ..................... 429/231.95; 502/182; 429/27
(58) Field of Classification Search ................... 502/182
See application file for complete search history.

(56) References Cited

U.S. PATENT DOCUMENTS

| | | | | |
|---|---|---|---|---|
| 5,133,842 A | * | 7/1992 | Taylor et al. ................ | 205/532 |
| 5,569,553 A | * | 10/1996 | Smesko et al. ................ | 429/90 |
| 6,497,848 B1 | * | 12/2002 | Deeba et al. ................ | 422/180 |
| 7,338,732 B1 | * | 3/2008 | Cooper et al. ................ | 429/44 |
| 7,585,579 B1 | * | 9/2009 | Read ............................ | 429/29 |
| 2004/0229107 A1 | * | 11/2004 | Smedley ...................... | 429/40 |

FOREIGN PATENT DOCUMENTS

JP       2005-166685       6/2005

OTHER PUBLICATIONS

U.S. Appl. No. 12/130,068, filed May 30, 2008, Shiga, et al.

* cited by examiner

*Primary Examiner*—Dah-Wei D Yuan
*Assistant Examiner*—Patricia Davis
(74) *Attorney, Agent, or Firm*—Oblon, Spivak, McClelland, Maier & Neustadt, L.L.P.

(57) ABSTRACT

A lithium-air battery includes a lithium negative electrode, a positive electrode including a catalyst containing gold, and a non-aqueous electrolyte interposed between the positive electrode and the lithium negative electrode. The catalyst includes gold supported on a cerium-containing oxide, such as a cerium-zirconium compound oxide or a cerium-aluminum compound oxide. The amount of catalyst of the positive electrode is in the range of 0.01 to 50 weight percent relative to the total weight of the positive electrode.

12 Claims, 3 Drawing Sheets

LITHIUM-AIR BATTERY

BACKGROUND OF THE INVENTION

1. Field of the Invention

The present invention relates to a lithium-air battery.

2. Description of the Related Art

A known lithium-air battery is a rechargeable secondary battery including a positive electrode that contains lithium oxide or lithium peroxide and that oxidizes or reduces oxygen, a negative electrode that contains a carbonaceous substance absorbing and releasing lithium ions, and an electrolyte interposed between the positive electrode and the negative electrode (see, for example, Japanese Unexamined Patent Application Publication No. 2005-166685 (document '685)). The secondary cell disclosed in document '685 prevents metallic lithium from precipitating on the surface of the negative electrode because of the presence of the carbonaceous substance, thus further improving the charge/discharge cycle lifetime.

SUMMARY OF THE INVENTION

In the battery disclosed in document '685, the positive electrode is not specifically studied. Accordingly, a reduction of oxygen may not be satisfactorily carried out at the positive electrode during discharging. In such a case, discharging at a high cell potential (i.e., voltage) cannot be performed or the discharge capacity is decreased.

The present invention has been conceived in light of the above problems. It is an object of the present invention to provide a lithium-air battery that can discharge at a higher cell potential. It is another object of the present invention to provide a lithium-air battery having a larger discharge capacity.

To achieve the above objects, the present inventors have conducted intensive studies and prepared a lithium-air battery that utilizes oxygen as a positive electrode active material and that includes a lithium negative electrode, a positive electrode including a catalyst containing gold, and a non-aqueous electrolyte interposed between the positive electrode and the lithium negative electrode. As a result, the present inventors have found that this lithium-air battery discharges at a higher cell potential and has a higher discharge capacity, and this finding resulted in completion of the present invention.

More specifically, a lithium-air battery of the present invention includes a lithium negative electrode, a positive electrode including a catalyst containing gold, and a non-aqueous electrolyte interposed between the positive electrode and the lithium negative electrode.

According to the lithium-air battery of the present invention, discharging can be performed at a higher cell potential. In addition, a lithium-air battery having a larger discharge capacity can be provided.

DESCRIPTION OF THE PREFERRED EMBODIMENTS

Figure 1:
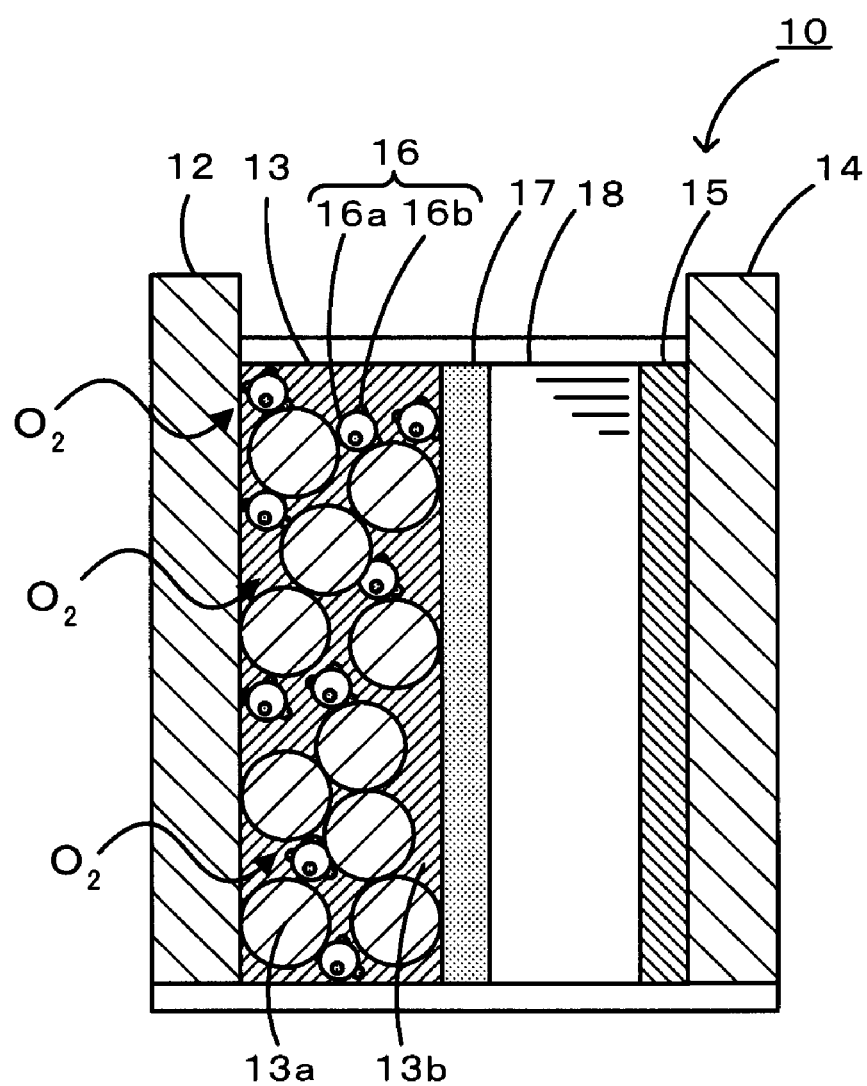
FIG. 1 is a schematic view of a lithium-air battery cell of the present invention.

In a lithium-air battery of the present invention, a lithium negative electrode may be made of, for example, metallic lithium or a lithium alloy, but is preferably made of metallic lithium. Examples of the lithium alloy include alloys of lithium with aluminum, tin, magnesium, indium, calcium, or the like.

In the lithium-air battery of the present invention, a positive electrode includes a catalyst containing gold. This catalyst may include a support carrying gold, which functions as a catalyst component. Examples of the support include oxides, zeolite, clay minerals, and carbon. Among these, oxides and carbon are preferred. Examples of the oxides include, but are not particularly limited to, alumina, silica, ceria, zirconia, and titania. A plurality of these oxides may be used in combination. Examples of the oxides further include oxides containing at least one metal selected from cerium (Ce), praseodymium (Pr), samarium (Sm), europium (Eu), terbium (Tb), thulium (Tm), ytterbium (Yb), antimony (Sb), tellurium (Te), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Among these, oxides containing cerium are preferred because they function as a buffer of oxygen. For example, a cerium-zirconium compound oxide and a cerium-aluminum compound oxide are more preferable. Examples of carbon include carbon blacks such as ketjen black, acetylene black, channel black, furnace black, lamp black, and thermal black; graphite such as natural graphite, e.g., scaly graphite, artificial graphite, and expanded graphite; activated carbon made from charcoal, coal, or the like; and carbon fibers produced by carbonizing a synthetic fiber, a petroleum pitch material, or the like. In addition, the positive electrode preferably includes the above catalyst in an amount in the range of 0.01 to 50 weight percent relative to the total weight of the positive electrode. When the content of the catalyst is 0.01 weight percent or more, a satisfactory effect of the catalyst can be achieved. When the content of the catalyst is 50 weight percent or less, the content of other components (such as a conductive material and a binder) contained in the positive electrode relative to the content of the catalyst is not excessively low, and thus, for example, a decrease in the conductivity or mechanical strength of the positive electrode can be suppressed. The content of gold contained in the positive electrode is preferably in the range of 0.001 to 15 weight percent relative to the total weight of the positive electrode.

The positive electrode of the lithium-air battery of the present invention may include a conductive material. The conductive material is not particularly limited as long as the material has conductivity. Examples of the conductive material include the above-mentioned carbon blacks, graphite, activated carbon, and carbon fibers. Examples of the conductive material further include conductive fibers such as metal fibers; metal powders such as a copper powder, a silver powder, a nickel powder, and an aluminum powder; and organic conductive materials such as a polyphenylene derivative. These conductive materials may be used alone or as a mixture of two or more conductive materials.

The positive electrode of the lithium-air battery of the present invention may include a binder. Examples of the binder include, but are not particularly limited to, thermoplastic resins and thermosetting resins. Specific examples thereof include polyethylene, polypropylene, polytetrafluoroethylene (PTFE), polyvinylidene fluoride (PVDF), styrene-butadiene rubbers, tetrafluoroethylene-hexafluoroethylene copolymers, tetrafluoroethylene-hexafluoropropylene (FEP) copolymers, tetrafluoroethylene-perfluoroalkyl vinyl ether (PFA) copolymers, vinylidene fluoride-hexafluoropropylene copolymers, vinylidene fluoride-chlorotrifluoroethylene copolymers, ethylene-tetrafluoroethylene copolymers (ETFE resins), polychlorotrifluoroethylene (PCTFE), vinylidene fluoride-pentafluoropropylene copolymers, propylene-tetrafluoroethylene copolymers, ethylene-chlorotrifluoroethylene (ECTFE) copolymers, vinylidene fluoride-hexafluoropropylene-tetrafluoroethylene copolymers, vinylidene fluoride-perfluoromethyl vinyl ether-tetrafluoroethylene copolymers, and ethylene-acrylic acid copolymers. These resins may be used alone or as a mixture of two or more resins.

In the lithium-air battery of the present invention, the positive electrode may be produced by, for example, mixing the catalyst, the conductive material, and the binder, and then forming the resulting mixture on a current collector by press forming. In order to rapidly diffuse oxygen, a grid-shaped or mesh-shaped porous body is preferably used as the current collector. A porous plate of a metal such as a stainless steel, nickel, aluminum, or copper can be used as the current collector. In order to suppress oxidation of the current collector, the surface of the current collector may be coated with an oxidation-resistant metal film or an oxidation-resistant alloy film.

In the lithium-air battery of the present invention, either air or oxygen may be used as the positive electrode active material.

In the lithium-air battery of the present invention, an example of the electrolyte is a non-aqueous electrolyte solution containing an electrolyte salt. Examples of the electrolyte salt include, but are not particularly limited to, known electrolyte salts such as $LiPF_6$, $LiClO_4$, $LiAsF_6$, $LiBF_4$, $Li(CF_3SO_2)_2N$, $Li(CF_3SO_3)$, and $LiN(C_2F_5SO_2)$. These electrolyte salts may be used alone or in combinations of two or more salts. The concentration of the electrolyte salt is preferably in the range of 0.1 to 2.0 M, and more preferably in the range of 0.8 to 1.2 M. Aprotic organic solvents can be used as the electrolyte solution. Examples of such organic solvents include cyclic carbonates, chain carbonates, cyclic esters, cyclic ethers, and chain ethers. Specific examples of the cyclic carbonates include ethylene carbonate, propylene carbonate, butylene carbonate, and vinyl carbonate. Specific examples of the chain carbonates include dimethyl carbonate, diethyl carbonate, and methyl ethyl carbonate. Specific examples of the cyclic ester carbonates include γ-butyrolactone and γ-valerolactone. Specific examples of the cyclic ethers include tetrahydrofuran and 2-methyltetrahydrofuran. Specific examples of the chain ethers include dimethoxyethane and ethylene glycol dimethyl ether. These organic solvents may be used alone or as a mixture of two or more solvents.

The lithium-air battery of the present invention may include a separator between the lithium negative electrode and the positive electrode. The separator is not particularly limited as long as the separator has a composition that can withstand the range of environments in which the lithium-air battery is to be used. Specific examples of the separator include polymer nonwoven fabrics such as a polypropylene nonwoven fabric and a polyphenylene sulfide nonwoven fabric, and microporous films made of an olefin resin such as polyethylene or polypropylene. These materials may be used alone or in combinations of two or more materials.

Examples of the shape of the lithium-air battery of the present invention include, but are not particularly limited to, a coin shape, a button shape, a sheet shape, a laminate shape, a cylindrical shape, a laminar shape, and a rectangular shape. The lithium-air battery of the present invention may be applied to a large cell used for electric vehicles or the like. FIG. 1 is a schematic view of an example of a lithium-air battery cell of the present invention. A lithium-air battery cell 10 includes a positive electrode 13 formed on a current collector 12, a lithium negative electrode 15 adjacent to a current collector 14, and an electrolyte solution 18 disposed between the positive electrode 13 and the lithium negative electrode 15. A separator 17 is provided between the positive electrode 13 and the electrolyte solution 18. The positive electrode 13 is prepared by forming a mixture including a catalyst 16 containing a catalyst component 16b supported on a support 16a, a conductive material 13a, and a binder 13b by press forming.

This application claims priority from the Japanese Patent Application No. 2007-8907 filed in the Japanese Patent Office on Jan. 18, 2007, and the entire contents of the specification, drawings, and claims disclosed in the application are incorporated herein by reference.

EXAMPLES

Example 1

A catalyst used for a positive electrode was prepared as follows. An aqueous solution was prepared by mixing cerium nitrate and zirconium nitrate so that ceria and zirconia, which were final products, had a weight ratio ceria:zirconia of 5:1. Aqueous ammonia was then added dropwise to the aqueous solution in a beaker under stirring to neutralize the solution, thus producing a precipitate. The precipitate was heated to 400° C. in air and maintained for five hours to vaporize and decompose ammonium nitrate contained in the precipitate. Subsequently, the precipitate was further sintered at 600° C. in air for five hours, thus allowing a ceria-zirconia solid solution powder (cerium-zirconium compound oxide) to be obtained. The specific surface area of this solid solution powder was measured with a MICROSORP 4223II manufactured by Microdata K.K. by a BET one-point method utilizing nitrogen adsorption. The solid solution powder had a specific surface area of 65 $m^2/g$. The solid solution powder was used as a support, and gold was supported on the surface of the powder by being deposited by vacuum evaporation to prepare a catalyst. The amount of gold supported was 0.6 parts by weight relative to 100 parts by weight of the support powder.

Figure 2:
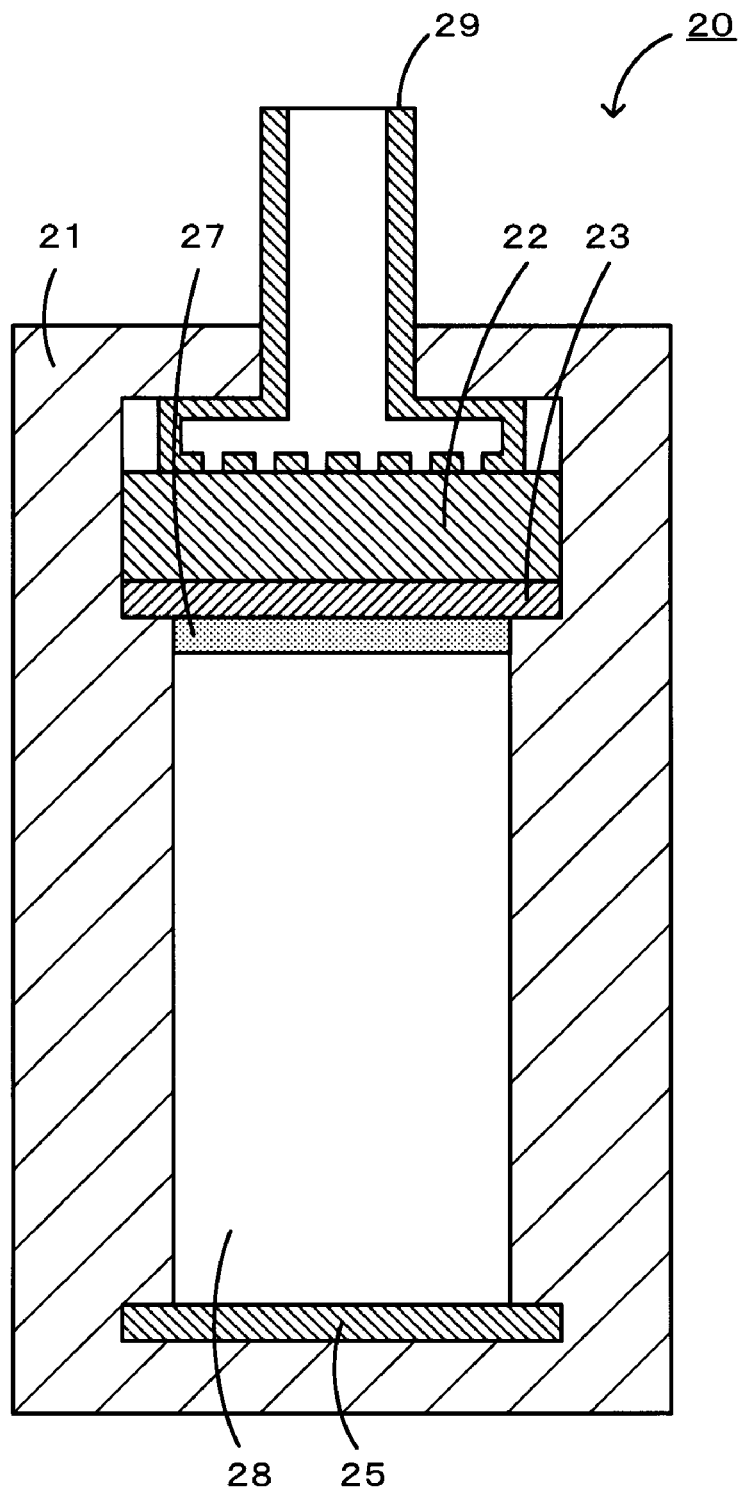
FIG. 2 is a cross-sectional view of an F-type electrochemical cell 20.

The positive electrode was prepared as follows. First, 14.6 parts by weight of the above catalyst, 83 parts by weight of carbon (Printex, manufactured by Degussa AG), and 2.4 parts by weight of polytetrafluoroethylene (manufactured by Kureha Corporation) were mixed, and the mixture was then formed into a thin film. The thin film was weighed so as to contain 5 mg of carbon. The thin film was pressure-bonded on a nickel mesh and then vacuum-dried, thus allowing the positive electrode of a lithium-air battery cell to be prepared. A metallic lithium electrode (manufactured by Tanaka Kikinzoku Kogyo K.K.) having a diameter of 10 mm and a thickness of 0.5 mm was used as a negative electrode. An F-type electrochemical cell 20 manufactured by Hokuto Denko Corporation was assembled using these electrodes. FIG. 2 shows the F-type electrochemical cell 20. First, a negative electrode 25 was placed in a stainless steel casing 21. A positive electrode 23 on which a separator 27 (E25MMS manufactured by Tapyrus Co., Ltd.) was provided at the side facing the negative electrode 25 was set so as to face the negative electrode 25. A non-aqueous electrolyte solution (manufacture by Tomiyama Pure Chemical Industries, Ltd.) containing 1 M of lithium phosphate hexafluoride as an electrolyte salt, 30 parts by weight of ethylene carbonate, and 70 parts by weight of diethyl carbonate was injected as an electrolyte solution 28 between the positive electrode 23 and the negative electrode 25. Subsequently, a foamed nickel plate 22 was placed on the positive electrode 23. The positive electrode 23 was pressed from above the foamed nickel plate 22 with a holding member 29, through which air can communicate with the positive electrode 23 side, thereby fixing the cell. Thus, the lithium-air battery cell of Example 1 was prepared. Although not shown in the figure, the casing 21 can be separated into an upper part that is in contact with the positive electrode 23 and a lower part that is in contact with the negative electrode 25, and an insulating resin is interposed between the upper part and the lower part. Accordingly, the positive electrode 23 is electrically insulated from the negative electrode 25.

Example 2

A catalyst used for a positive electrode was prepared as follows. An aqueous solution was prepared by mixing cerium nitrate and aluminum nitrate so that ceria and alumina, which were final products, had a weight ratio ceria:alumina of 89:11. Aqueous ammonia was then added dropwise to the aqueous solution in a beaker under stirring to neutralize the solution, thus producing a precipitate. The precipitate was heated to 400° C. in air and maintained for five hours to vaporize and decompose ammonium nitrate contained in the precipitate. Subsequently, the precipitate was further sintered at 600° C. in air for five hours, thus allowing a ceria-alumina solid solution powder (cerium-aluminum compound oxide) to be obtained. The specific surface area of this solid solution powder was measured as in Example 1. The solid solution powder had a specific surface area of 90.1 m$^2$/g. The solid solution powder was used as a support, and gold was supported on the surface of the powder by being deposited by vacuum evaporation to prepare a catalyst. The amount of gold supported was 0.7 parts by weight relative to 100 parts by weight of the support powder. The positive electrode was prepared using the catalyst and the F-type electrochemical cell 20 of Example 2 was assembled by the same methods as those used in Example 1.

Comparative Example 1

The lithium-air battery cell of Comparative Example 1 was prepared as in Example 1 except for the following. Specifically, 2.5 parts by weight of manganese dioxide (manufactured by Mitsui Mining and Smelting Co., Ltd.), which was used as a catalyst, 95 parts by weight of carbon (Printex, manufactured by Degussa AG), and 2.4 parts by weight of polytetrafluoroethylene (manufactured by Kureha Corporation) were mixed, and the mixture was then formed into a thin film. The thin film was weighed so as to contain 5 mg of carbon. The thin film was pressure-bonded on a nickel mesh and then vacuum-dried. Thus, a positive electrode of the lithium-air battery cell was prepared.

Discharge Test

Figure 3:
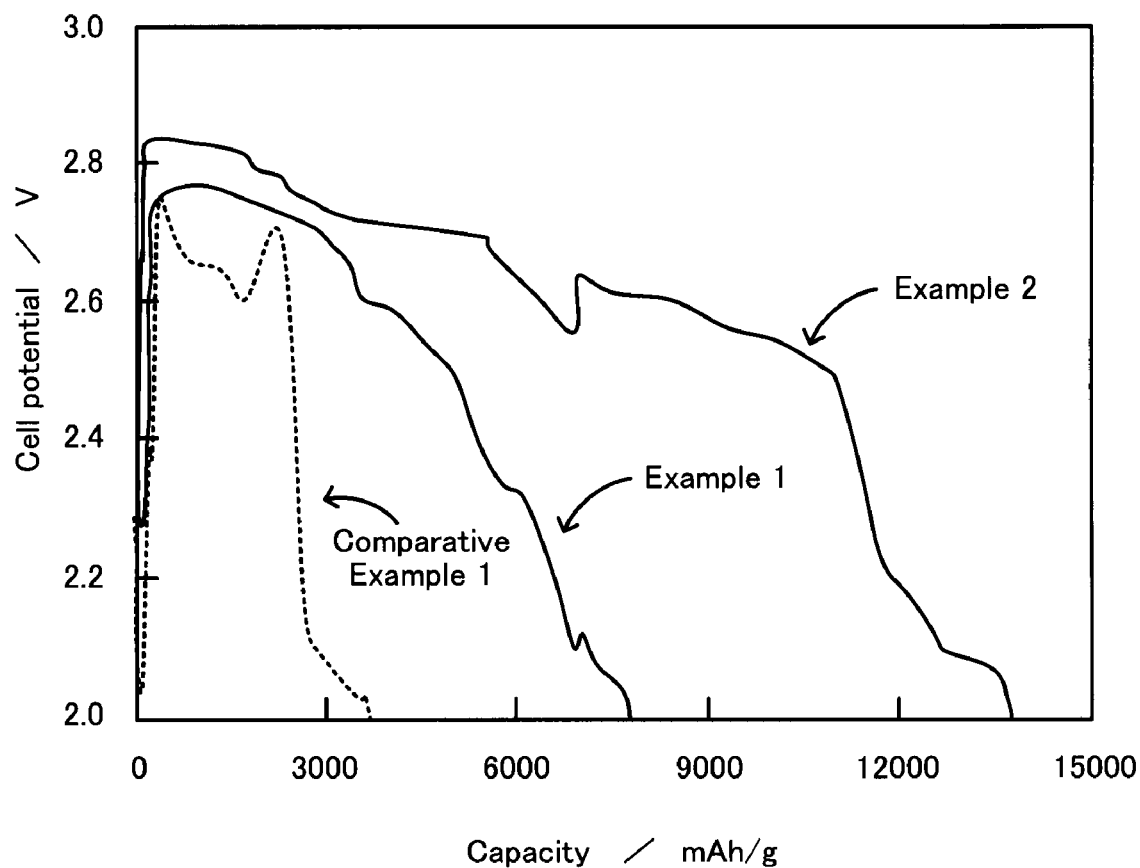
FIG. 3 is a graph showing changes in the cell potential and the discharge capacity in a discharge test.

Each of the F-type electrochemical cells 20 thus prepared was set in a charge/discharge device (Model: HJ1001SM8A) manufactured by Hokuto Denko Corporation. A current of 50.5 mA was supplied between the positive electrode 23 and the negative electrode 25, and discharge was performed until the open-circuit voltage became 2.0 V. This discharge test was performed at 25° C. FIG. 3 is a graph showing changes in the cell potential and the discharge capacity in the discharge test. Table 1 shows the average potential until the discharge capacity reaches 2,500 mAh/g and the discharge capacity. Referring to these results, the lithium-air battery cell of Example 1 including a positive electrode containing a gold-carrying cerium-zirconium compound oxide as a catalyst and the lithium-air battery cell of Example 2 including a positive electrode containing a gold-carrying cerium-aluminum compound oxide as a catalyst showed average potentials higher than that of Comparative Example 1. In addition, since the catalytic activity did not significantly decrease, the lithium-air battery cells of Examples 1 and 2 had larger discharge capacities. Additionally, a positive electrode was prepared using platinum as a catalyst component, and the same experiment was performed. The results were the same as those of Comparative Example 1.

TABLE 1

| | Average potential[1] V | Discharge capacity mAh/g |
|---|---|---|
| Example 1 | 2.74 | 7800 |
| Example 2 | 2.80 | 13800 |
| Comparative Example 1 | 2.67 | 3665 |

[1]Average potential until the discharge capacity reaches 2500 mAh/g

What is claimed is:

1. A lithium-air battery comprising:
   a lithium negative electrode;
   a positive electrode including a catalyst containing gold; and
   a non-aqueous electrolyte interposed between the positive electrode and the lithium negative electrode,
   wherein the catalyst is supported on ceria-alumina solid solution powder.

2. The lithium-air battery according to claim 1, wherein the amount of catalyst of the positive electrode is in the range of 0.01 to 50 weight percent relative to the total weight of the positive electrode.

3. The lithium-air battery according to claim 1, wherein the negative electrode comprises metallic lithium.

4. The lithium air battery according to claim 1, wherein the positive electrode includes a conductive material.

5. The lithium air battery according to claim 1, wherein the electrolyte includes an electrolyte salt whose concentration is between 0.8 to 1.2 M.

6. The lithium air battery according to claim 1 further including a separator provided on the positive electrode at a side of the positive electrode that faces the negative electrode.

7. The lithium air battery according to claim 1, wherein the lithium-air battery is an electrochemical cell.

8. The lithium air battery according to claim 7 further comprising:
   a casing that includes stainless steel,
   wherein the lithium negative electrode is provided in the casing at a bottom portion.

9. The lithium air battery according to claim 8,
   wherein the positive electrode is provided in the casing at a top portion which opposes the bottom portion of the casing, and
   wherein the positive electrode is provided with a separator on a side facing the lithium negative electrode.

10. The lithium air battery according to claim 9,
    wherein the positive electrode is provided with a plate on a side of the positive electrode opposite of the separator, and
    wherein the positive electrode communicates with air through the plate.

11. The lithium air battery according to claim 10, wherein the plate is a foamed nickel plate.

12. The lithium air battery according to claim 1, wherein a ratio by weight of the gold to the ceria-alumina solid solution powder is 0.7:100.

* * * * *